US011923964B2

(12) United States Patent
Ammar (10) Patent No.: US 11,923,964 B2
(45) Date of Patent: Mar. 5, 2024

(54) PORTABLE TROPOSCATTER COMMUNICATION TERMINAL

(71) Applicant: Comtech Systems Inc., Orlando, FL (US)

(72) Inventor: Danny Ammar, Orlando, FL (US)

(73) Assignee: COMTECH SYSTEMS INC., Orlando, FL (US)

(*) Notice: Subject to any disclaimer, the term of this patent is extended or adjusted under 35 U.S.C. 154(b) by 528 days.

(21) Appl. No.: 17/167,765

(22) Filed: Feb. 4, 2021

(65) Prior Publication Data

US 2021/0376920 A1 Dec. 2, 2021

Related U.S. Application Data

(60) Provisional application No. 62/957,631, filed on Jan. 6, 2020.

(51) Int. Cl.

| | |
|---|---|
| *H04B 7/22* | (2006.01) |
| *H01Q 3/08* | (2006.01) |
| *H04B 1/12* | (2006.01) |
| *H04B 7/0456* | (2017.01) |
| *H04B 7/12* | (2006.01) |
| *H04L 9/40* | (2022.01) |

(52) U.S. Cl.
CPC ............... *H04B 7/22* (2013.01); *H01Q 3/08* (2013.01); *H04B 1/123* (2013.01); *H04B 7/0473* (2013.01); *H04B 7/12* (2013.01); *H04L 63/0428* (2013.01)

(58) Field of Classification Search
CPC .......... H04B 7/22; H04B 7/0473; H04B 7/12; H04B 1/123; H04L 63/0428; H01Q 3/08

USPC ........................................................ 342/367
See application file for complete search history.

(56) References Cited

U.S. PATENT DOCUMENTS

| | | | |
|---|---|---|---|
| 10,205,513 B1 * | 2/2019 | Winters | H04W 24/02 |
| 10,490,889 B1 * | 11/2019 | Enserink | H04B 7/0682 |
| 2017/0062900 A1 * | 3/2017 | Velez | H01Q 3/08 |

FOREIGN PATENT DOCUMENTS

| | | | | |
|---|---|---|---|---|
| CA | 3116833 A1 * | 5/2019 | | H04B 7/22 |
| CA | 3116986 A1 * | 5/2019 | | G06F 16/907 |
| CN | 100416920 C * | 9/2008 | | A61K 31/517 |
| RU | 2715554 C1 * | 3/2020 | | |
| WO | WO-2019077839 A1 * | 4/2019 | | H04B 7/08 |

* cited by examiner

*Primary Examiner* — Harry K Liu
(74) *Attorney, Agent, or Firm* — TAROLLI, SUNDHEIM, COVELL & TUMMINO L.L.P.

(57) ABSTRACT

One example includes a troposcatter communication terminal. The terminal includes an antenna comprising a plurality of communication ports that extend from a rear side of the antenna to a front side of the antenna. The terminal also includes a positioner mechanically coupled to the antenna and being configured to mechanically control positioning of the antenna. The terminal further includes an electronics package mechanically coupled to the rear side of the antenna. The electronics package includes a troposcatter radio communicatively coupled to the antenna via the plurality of communications ports to transmit and receive troposcatter communication signals via the plurality of communication ports at the front side of the antenna.

20 Claims, 6 Drawing Sheets

PORTABLE TROPOSCATTER COMMUNICATION TERMINAL

RELATED APPLICATIONS

The present invention is a Nonprovisional Application under 35 USC 111(a), claiming priority to US Provisional Application Serial No. 62/957631, filed on 6 Jan. 2020, the entirety of which is incorporated herein by reference.

TECHNICAL FIELD

The present disclosure relates generally to communication systems, and specifically to a portable troposcatter communication terminal.

BACKGROUND

Wireless communications systems have been implemented for many years to provide long-range communication. Typical wireless communication systems provide for the transmission of data between antennas that have line-of-sight, such that long-range communications typically involve interposing transceivers or repeaters. Normally, signals in the microwave frequency range travel in straight lines, and are thus limited to line-of-sight (LOS) applications in which the receiver can be "seen" by the transmitter. LOS communication distances are therefore limited by the visual horizon (e.g., around 30-40 miles).

However, some long-range communications involve scattering of radio frequency (RF) communication waves, such as from the troposphere of Earth's atmosphere (e.g., troposcatter communications). Troposcatter communications is a method of communicating with microwave radio signals over considerable distances, such as up to approximately 190 miles or farther depending on terrain and climate factors. In troposcatter communications, radio signals are transmitted in a narrow beam aimed just above the horizon in the direction of the receiver terminal, such that the radio waves are randomly scattered as they pass through the upper layers of the troposphere. As the signals pass through the troposphere, some of the energy is scattered forward allowing the receiver station to pick up the signal.

SUMMARY

One example includes a troposcatter communication terminal. The terminal includes an antenna comprising a plurality of communication ports that extend from a rear side of the antenna to a front side of the antenna. The terminal also includes a positioner mechanically coupled to the antenna and being configured to mechanically control positioning of the antenna. The terminal further includes an electronics package mechanically coupled to the rear side of the antenna. The electronics package includes a troposcatter radio communicatively coupled to the antenna via the plurality of communications ports to transmit and receive troposcatter communication signals via the plurality of communication ports at the front side of the antenna.

Another example includes a method for providing troposcatter communication. The method includes digitally processing digital transmit data via a modem associated with a first troposcatter communication terminal and implementing analog processing of the digital transmit data via a multiple-input and multiple-output (MIMO) transceiver to generate a plurality of transmit signals. The method also includes providing the plurality of transmit signals to a radio frequency (RF) front-end via at least one of a plurality of radio ports of a troposcatter radio for transmission via a respective at least one of a plurality of antenna ports of an antenna. The troposcatter radio can be mechanically connected to a rear side of the antenna such that the plurality of radio ports are mechanically connected to the respective plurality of antenna ports. The method also includes receiving a plurality of receiver signals provided from a second troposcatter communication terminal via at least one of the plurality of antenna ports of the antenna of the first troposcatter communication terminal and implementing analog processing of the plurality of receiver signals to generate a plurality of receiver signals via the MIMO transceiver. The method further includes combining and equalizing the plurality of digital receiver signals via a combiner to generate a digital receiver signal, and digitally processing the digital receiver signal via the modem to generate digital receiver data.

Another example includes a troposcatter communication system. The system includes a first troposcatter communication terminal. The first troposcatter communication terminal includes a carbon fiber antenna comprising a plurality of communication ports that extend from a rear side of the antenna to a front side of the antenna and an electronics package mechanically coupled to the rear side of the antenna. The electronics package includes a troposcatter radio communicatively coupled to the antenna via the plurality of communications ports to transmit and receive troposcatter communication signals via the plurality of communication ports at the front side of the antenna, the electronics package operating with a prime power of less than approximately 150 Watts. The first troposcatter communication terminal further includes a collapsible tripod to provide singular human portability of the first troposcatter communication terminal, such that the first troposcatter communication terminal is collapsible to a volume of less than approximately six cubic feet and has a weight of less than approximately 100 pounds. The system also includes a second troposcatter communication terminal. The second troposcatter communication terminal includes an antenna comprising a plurality of communication ports and a troposcatter radio communicatively coupled to the antenna via the plurality of communications ports to transmit the troposcatter communication signals to and receive the troposcatter communication signals from the first troposcatter communication terminal via the plurality of communication ports.

DETAILED DESCRIPTION

The present disclosure relates generally to communication systems, and specifically to a portable troposcatter communication terminal. The portable troposcatter communication terminal can be implemented in a troposcatter communication system, such that the portable troposcatter communication terminal can be implemented to at least one of transmit and receive troposcatter communication signals. As an example, a troposcatter communication system can include two portable troposcatter communication terminals communicating via troposcatter communication signals. As described herein, the portable troposcatter communication terminal can be manufactured to be human-portable, such that the portable troposcatter communication terminal can be portable by a singular human. For example, the portable troposcatter communication terminal can be lightweight and collapsible, such that the portable troposcatter communication terminal can be carried by a single person and field-installed to implement troposcatter communications.

The portable troposcatter communication terminal implements a compact troposcatter radio design and close-coupling of the troposcatter radio to an antenna to provide for short physical connections between the troposcatter radio and the antenna. For example, the troposcatter radio can be mechanically connected to a rear portion of the antenna, opposite a front portion from which troposcatter communication signals can be transmitted and at which troposcatter communication signals can be received. Based on this proximal mounting of the troposcatter radio to the antenna, the communication channels of the troposcatter radio can be very closely connected to the communication channels of the antenna. For example, the communication channels of the troposcatter radio and the antenna can be directly mechanically connected, such as absent an interposing cable. As another example, the communication channels of the troposcatter radio and the antenna can be integral with respect to each other, such as absent any mechanical connectors between the communication channels of the troposcatter radio and the antenna. As yet another example, the communication channels of the troposcatter radio and the antenna can be coupled by a short (e.g., less than five inch) cable.

As a result, the short connections of the communication channels between the troposcatter radio and the antenna can result in a significant reduction in losses of the troposcatter communication signals propagating between the antenna and the troposcatter radio. Accordingly, heavy amplification components can be omitted from the design of the portable troposcatter communication terminal, such as to enable significantly lower-level signals from being transmitted from the portable troposcatter communication terminal and received at the portable troposcatter communication terminal. Omission of heavy amplifiers can result in a much more compact and lightweight design of the portable troposcatter communication terminal to facilitate human portability. Additionally, the antenna can be formed from a carbon fiber material, and the portable troposcatter communication terminal can include a collapsible tripod. As a result, the portable troposcatter communication terminal can be lightweight and able to be collapsed into a compact form-factor to further facilitate human portability.

Figure 1:
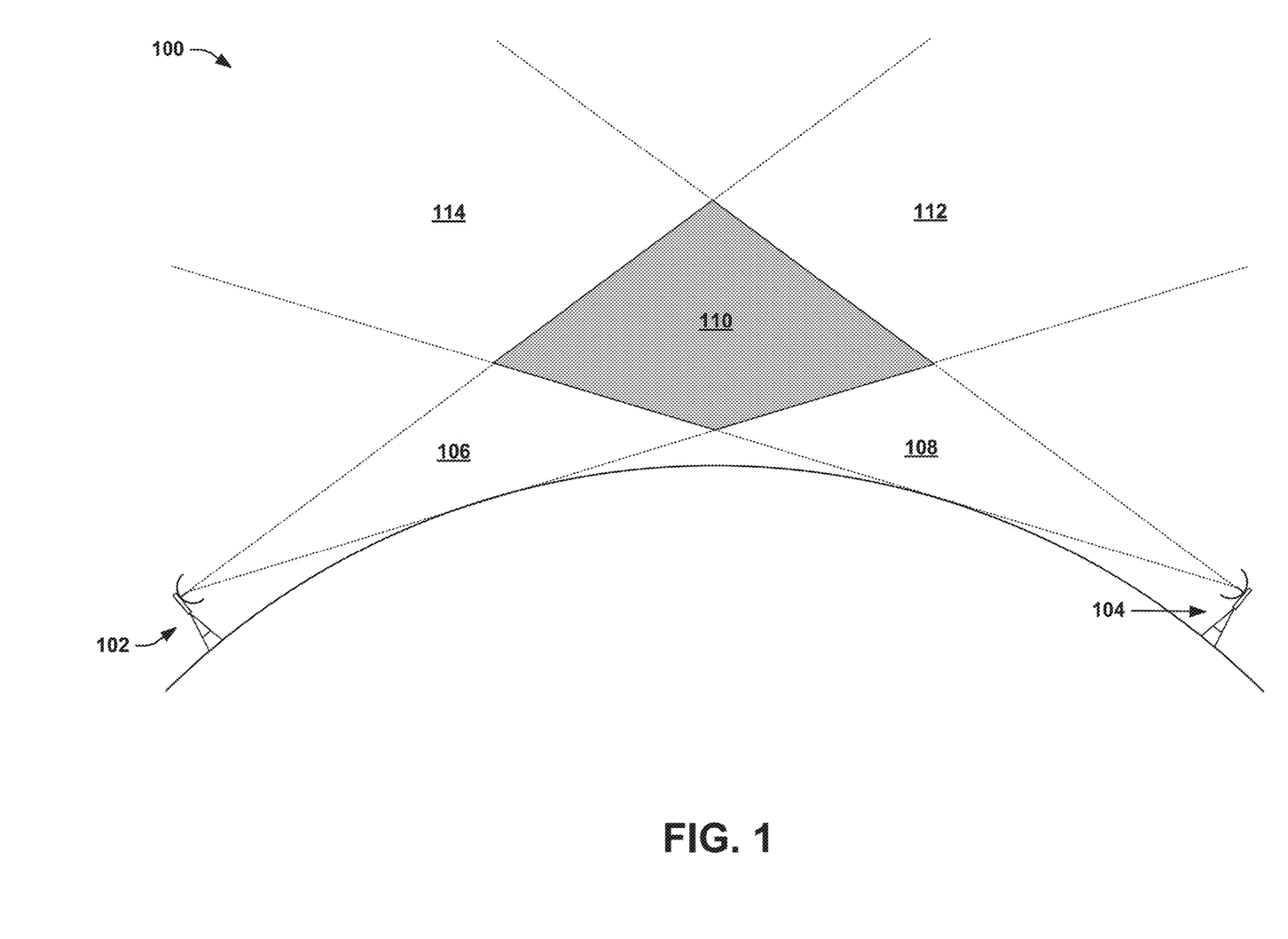
FIG. 1 illustrates an example of a troposcatter communication system.

FIG. 1 illustrates an example of a troposcatter communication system 100. The troposcatter communication system 100 can be implemented in any of a variety of wireless communications systems that implement scattering of wireless signals from the troposphere to achieve long-range communications. The troposcatter communication system 100 includes a first troposcatter terminal 102 and a second troposcatter terminal 104 that are configured to wirelessly communicate with each other via troposcatter communication signals. As an example, at least one of the first and second troposcatter terminals 102 and 104 can be configured as a singular human portable troposcatter communication terminal, as described in greater detail herein. As described herein, the troposcatter communication system 100 can correspond to a point-to-point link in which each of the troposcatter terminals 102 and 104 both transmitting and receiving troposcatter communication signals. In the example of FIG. 1, the troposcatter communication signals transmitted from the first troposcatter terminal 102 are demonstrated generally at 106, and the troposcatter communication signals transmitted from the second troposcatter terminal 104 are demonstrated generally at 108. The antenna(s) associated with each troposcatter terminal 102 and 104 are aimed at a fixed point in the troposphere (e.g., slightly above the horizon). In the example of FIG. 1, the region where the troposcatter communication signals 106 and 108 intersect is a "common volume" demonstrated at 110.

Due to the nature of troposcatter propagation, a small portion of the energy of the transmitted troposcatter communication signals 106 and 108 is scattered and reflected to the troposcatter terminals 104 and 102, respectively, in a usable manner. Therefore, most of the energy of the transmitted troposcatter communication signals 106 and 108 passes on into space and is lost as it disperses in every direction, as indicated in the example of FIG. 1 at 112 and 114, respectively.

As described above, at least one of the troposcatter terminals 102 and 104 can be configured as a portable troposcatter communication terminal. For example, the design of the portable troposcatter communication terminal can be such that the connections between the antenna and the electronics package including the troposcatter radio can be very short, thereby mitigating signal losses of the troposcatter communication signals (e.g., transmitted and/or received) between the antenna and the troposcatter radio. As a result, large and high-power consuming components can be omitted from the design of the troposcatter radio. Therefore, the portable troposcatter communication terminal can be manufactured in a significantly more lightweight manner than a typical troposcatter terminal. As a result, the portable troposcatter communication terminal can be collapsible and singular human portable to enable significantly more flexible troposcatter communication applications.

As an example, a typical troposcatter terminal can require substantial power and equipment, thereby limiting practicality as a tactical system. For example, a typical troposcatter terminal can include a large antenna (e.g., between 1.8 and 4 meters in diameter) and an electronic case that houses the modem, the power supply, and a frequency converter. The typical troposcatter terminal can also include a radio frequency (RF) case that includes transmit and receive RF filters and low noise amplifiers, and a solid-state amplifier case that typically includes large transmit amplifiers (e.g., between 500 W and 1 kW). The cases in a typical troposcatter terminal are connected to each other and/or to the antenna via cables. Based on the amount of hardware in a typical troposcatter terminal, the entire troposcatter antenna can weigh up to approximately 1000 pounds and can require multiple people to set up at the desired transmit/receive location. Additionally, the cases can be connected to the antenna feed with RF cables that can typically add several decibels (dBs) of RF losses.

Figure 2:
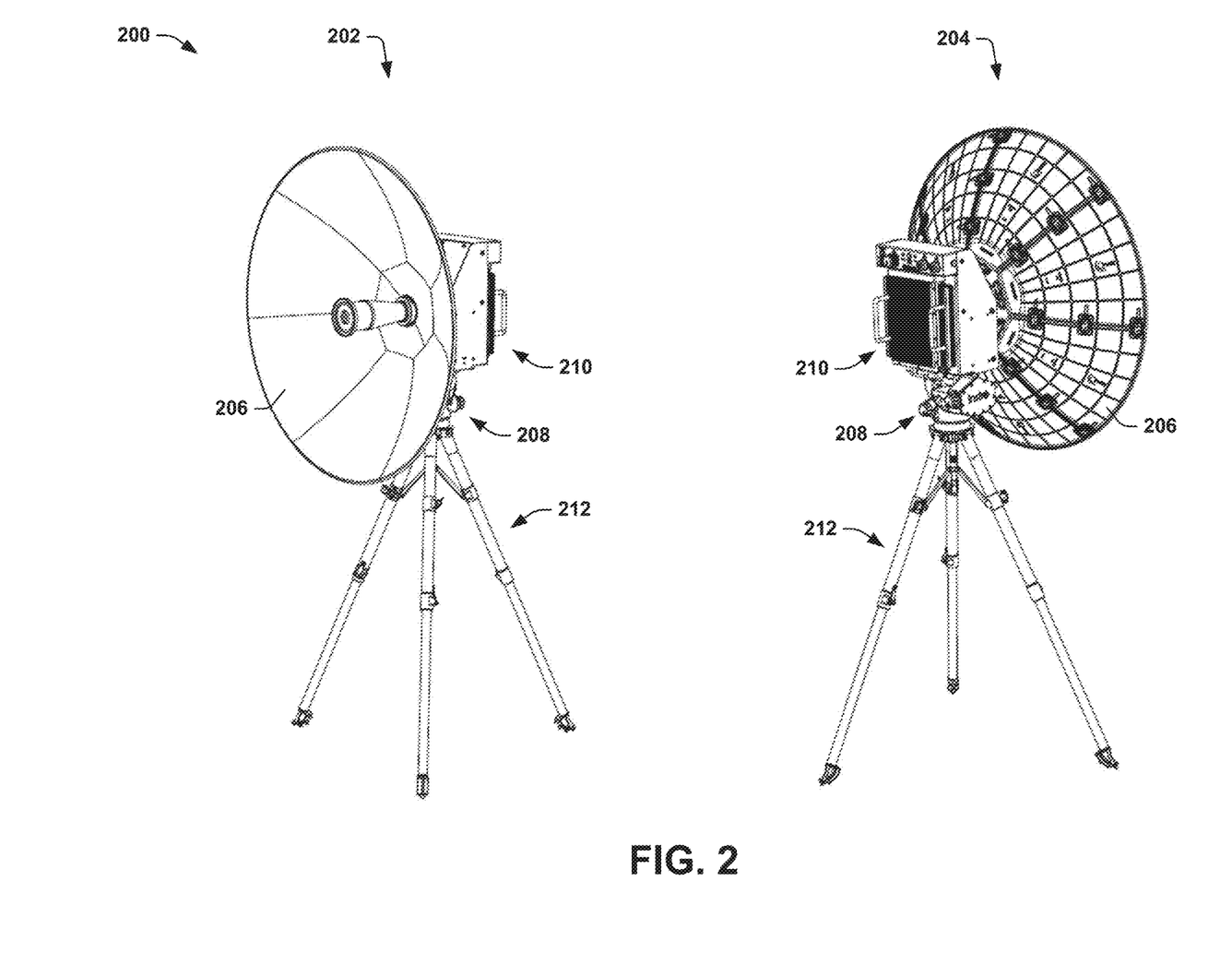
FIG. 2 illustrates an example of a troposcatter communication terminal.

FIG. 2 illustrates an example diagram 200 of a portable troposcatter communication terminal. The portable troposcatter communication terminal can correspond to one of the troposcatter terminals 102 and 104 in the example of FIG. 1. Therefore, reference is to be made to the example of FIG. 1 in the following description of the example of FIG. 2.

The diagram 200 demonstrates a first view 202 corresponding to a front view of the portable troposcatter communication terminal and a second view 204 corresponding to a rear view of the portable troposcatter communication terminal. The portable troposcatter communication terminal includes an antenna 206 having a front portion (visible in the first view 202) and a rear portion (visible I the second view 204). The antenna 206 is a dish antenna that can include a plurality of communication channels (e.g., separated by frequency and/or polarization). As an example, the antenna 206 can be formed from a carbon fiber material, such that the antenna 206 can be lightweight to improve portability. The portable troposcatter communication terminal also includes a positioner 208 that can facilitate mechanical positioning (e.g., rotation and/or orientation) of the antenna 206 to point the antenna 206 to a desired azimuth and elevation direction along the horizon with great precision (e.g., +/−0.1 degree). As an example, the positioner 208 can provide manual or electronic (e.g., motor) control of the positioning of the antenna 206.

The portable troposcatter communication terminal is demonstrated in the example of FIG. 2 as including an electronics package 210 that is mechanically connected to the rear portion of the antenna 206. The electronics package 210 can include the troposcatter radio, as well as amplifiers and other associated control components for operating the portable troposcatter communication terminal to transmit and receive troposcatter communication signals. The close coupling of the electronics package 210 to the antenna 206 can result in significant mitigation of troposcatter communication signal losses between the electronics package 210 and the antenna 206. For example, the electronics package 210 includes highly integrated electronics and RF assembly in a compact form-factor to mitigate RF losses. All of the RF connections in the electronics package 210 and between the antenna 206 can be made directly or can implement very short cables (e.g., less than approximately 5 inches).

As one example, the direct connection of the communication channels (e.g., input/output ports) of the electronics package 210 can be made between a mechanical connection (e.g., threaded connection) of an output port directly to a mechanical connection of an input port between the components of the electronics package 210, or between the electronics package 210 and the antenna 206. As another example, the direct connection of the communication channels of the electronics package 210 can be based on the output port and the input port between the components of the electronics package 210, or between the electronics package 210 and the antenna 206, being fabricated integral with respect to each other. As a result, the losses that can result from long cables interconnecting the electronics package 210 and the antenna 206 can be mitigated.

For example, typical troposcatter terminals can exhibit approximately 2-3 dB in RF losses in the transmit path and an additional approximately 2-3 dB losses in the receiver front-end. Such transmit and receiver losses can add up to approximately 4-6 dB when considering a tropospheric link performance. However, by providing direct mechanical connection between the communication ports of the electronics package 210 and the antenna 206, the portable troposcatter communication terminal described herein can exhibit RF losses to less than approximately 0.5 dB total in the transmit and receiver paths. As a result, the portable troposcatter communication terminal can transmit and receive troposcatter communication signals in a much more efficient manner, which obviates the need for large, heavy, and high-power consuming electronic components.

Accordingly, the portable troposcatter communication terminal described herein can transmit and receive troposcatter communication signals in a significantly more efficient manner, which results in a collapsible and much more portable design. As a result, the portable troposcatter communication terminal can be singular human portable. For example, instead of typical troposcatter terminals that weigh hundreds of pounds, have large antennas, and high-power amplifiers, the portable troposcatter communication terminal can weigh less than 100 pounds and can be collapsible to fit within a volume of less than six cubic feet. Additionally, the portable troposcatter communication terminal described herein can operate with the much smaller antenna 206 (e.g., less than approximately one meter in diameter), can employ amplifiers that operate at approximately ten or fewer watts, and can implement less than approximately 150 watts of prime power. As an example, with such low power requirements, the power to operate the portable troposcatter communication terminal can be supplied by solar power or battery power.

Additionally, in the example of FIG. 2, the portable troposcatter communication terminal includes a tripod stand 212 that is configured to support the portable troposcatter communication terminal. As an example, the tripod stand 212 can be collapsible and can be formed of a lightweight material (e.g., aluminum). Therefore, the tripod stand 212 can facilitate greater portability of the portable troposcatter communication terminal by enabling the portable troposcatter communication terminal to be collapsed into a compact form-factor. For example, the portable troposcatter communication terminal can be collapsed into a small enough form factor, such as less than approximately six cubic feet, to be disposed within a carrying case. Based on the lightweight design of the electronics package 210, as well as the small size and lightweight design of the antenna 206, such a carrying case can be carried by a single person.

Figure 3:
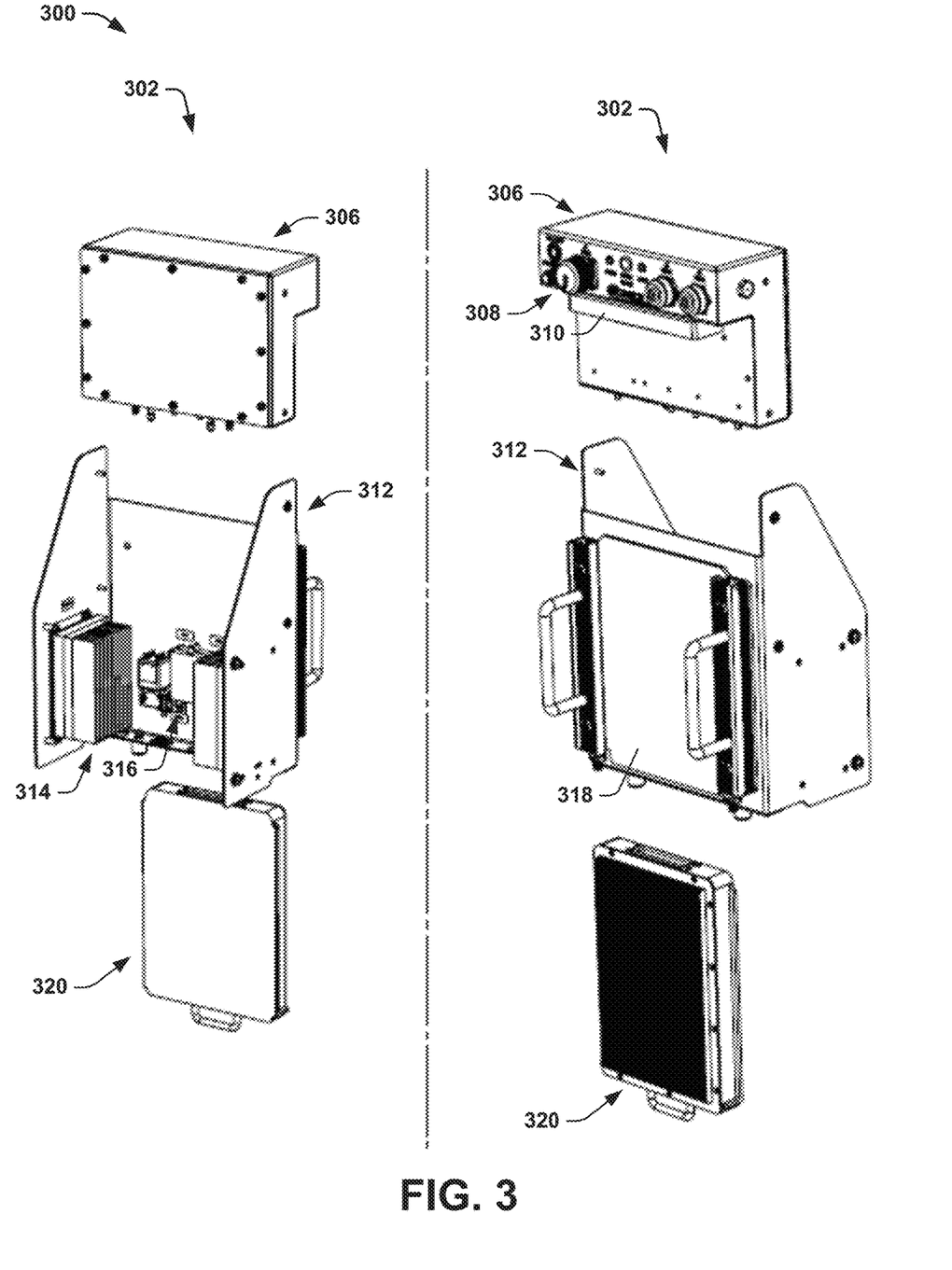
FIG. 3 illustrates an example of isometric views of an electronics package.

FIG. 3 illustrates an example diagram 300 of isometric exploded views of an electronics package. The electronics package can correspond to the electronics package 210 in the example of FIG. 2. Therefore, reference is to be made to the example of FIG. 2 in the following description of the example of FIG. 3.

In the example of FIG. 3, diagram 300 demonstrates a first view 302 of the electronics package and a second view 304 of the electronics package. The electronics package includes a backplane 306 that is configured to provide terminal external interface connectors, demonstrated generally at 308. The electronics package also includes a radio interface 310 and a hub 312. The hub 312 is configured to mount RF devices, demonstrated as solid state amplifiers (SSPAs) 314, low noise amplifiers (LNAs) 316, and a docking station 318. The electronics package further includes the troposcatter radio 320 that is configured to provide all the RF and modem signal processing functions for the portable troposcatter communication terminal.

The troposcatter radio 320 includes transceiver and signal processing components for generating troposcatter communication signals and processing received troposcatter communication signals. For example, the troposcatter radio 320 can include diversity combining receivers to detect and recover signals below a receiver noise level in a Rayleigh fading environment. Additionally, the troposcatter radio 320 can include a software-defined adaptive troposcatter modem and can be packaged in a compact sealed module that is capable of operations in all weather and harsh climates. Therefore, the portability of the portable troposcatter communication terminal combined with the sealed module can provide for field operation of the portable troposcatter communication terminal in remote regions that could otherwise be difficult to access. Additionally, whereas traditional troposcatter modems require large signal-to-noise ratios (SNR) to reliably detect troposcatter signals, the advanced signal processing capability of the modem in the troposcatter radio 320 allows it to detect signals below receiver thermal noise.

Figure 4:
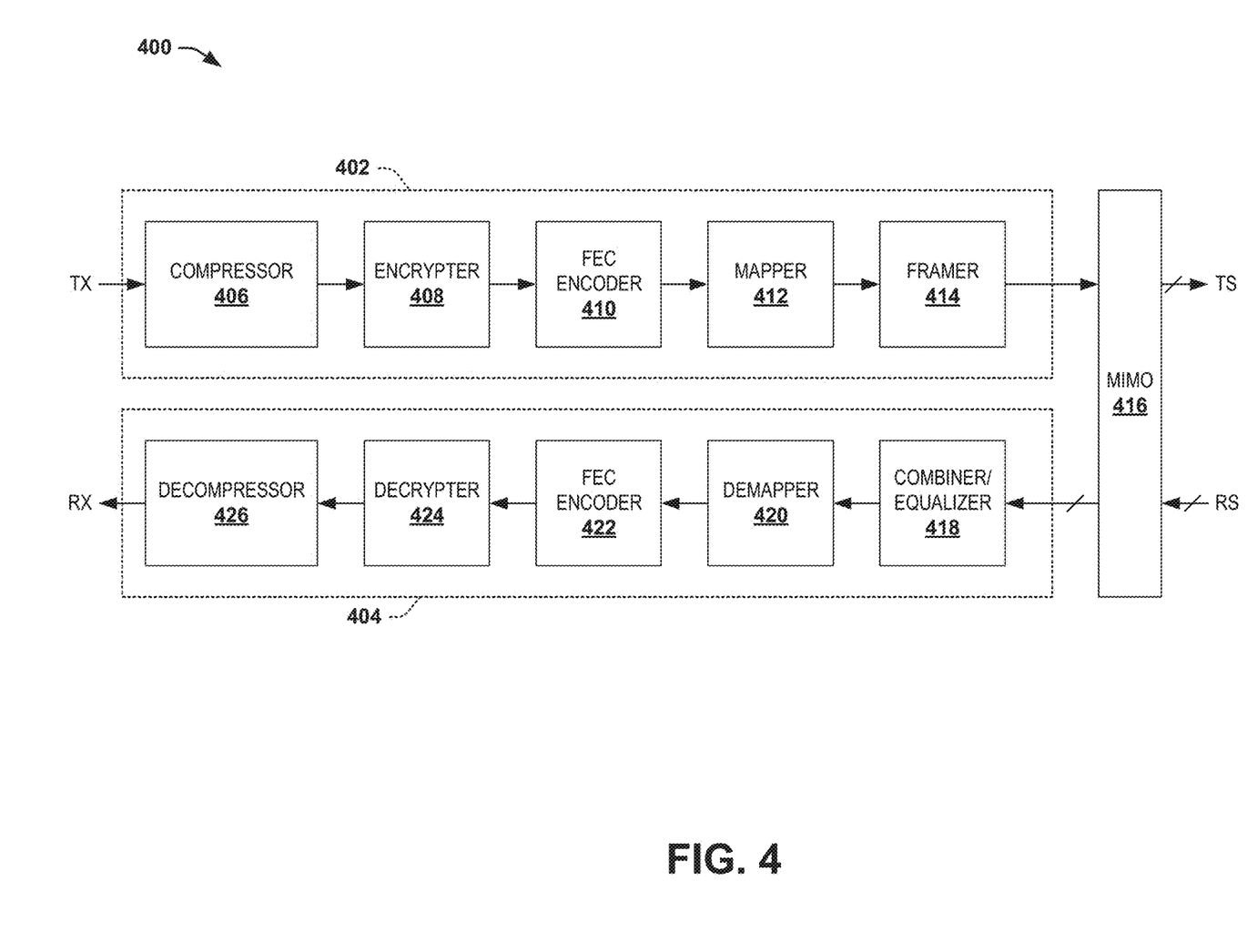
FIG. 4 illustrates an example of a block diagram of a troposcatter radio.

FIG. 4 illustrates an example of a block diagram of a troposcatter radio 400. The troposcatter radio 400 can correspond to the troposcatter radio 320 in the example of FIG. 3. Therefore, reference is to be made to the example of FIG. 3 in the following description of the example of FIG. 4.

The troposcatter radio 400 includes a transmit path 402 and a receive path 404 that collectively correspond to a modem of the troposcatter radio 400 (e.g., the modem in the troposcatter radio 320 described above). In the transmit path 402, digital transmit data TX is provided to a data compressor 406 that is configured to implement a data compression algorithm. For example, the data compression algorithm can be configured to provide 10:1 compression of the digital transmit data TX. The digital transmit data TX is then provided to a data encrypter 408 that is configured to encrypt the digital transmit data TX. For example, the data encrypter 408 can implement an Advanced Encryption Standard (AES) 256-bit encryption function. The digital transmit data TX is then provided to a forward error correction (FEC) encoder 410 that is configured to implement an FEC code on the digital transmit data TX. The digital transmit data TX is then provided to a mapper 412 that is configured to implement a mapping function. For example, the mapping function can map the digital transmit data TX into an amplitude phase-shift keying (APSK) constellation. The digital transmit data TX is then provided to a framer 414 that is configured to package the digital transmit data TX into frames.

The troposcatter radio 400 includes a multiple-input-multiple-output (MIMO) transceiver 416 that is arranged in the transmit path 402 and the receiver path 404. The MIMO transceiver 416 is configured to receive the frames of the digital transmit data TX and to convert the digital transmit data TX to analog (e.g., via a digital-to-analog converter (DAC)), to provide signal filtering, to up-convert the frequency (e.g., modulate), and to provide amplification. The MIMO transceiver 416 can thus provide a plurality of channels of analog transmission data, demonstrated in the example of FIG. 4 as troposcatter transmit signals TS. For example, the troposcatter transmit signals TS can correspond to channels having different frequencies. The troposcatter transmit signals TS are provided from the MIMO transceiver 416 to an RF front-end (not shown).

The MIMO transceiver 416 is also demonstrated in the example of FIG. 4 as receiving a plurality of troposcatter receive signals RS. For example, the troposcatter receive signals RS can correspond to signals of different frequencies and/or polarizations (e.g., horizontal and vertical linear polarizations). For example, the troposcatter receive signals RS can be received from a remote troposcatter terminal (e.g., the other of the two troposcatter terminals 102 and 104 in the example of FIG. 1). Therefore, the troposcatter receive signals RS can correspond to troposcatter transmit signals TS transmitted from another troposcatter terminal and reflected from the troposphere (e.g., in the common volume 110). The troposcatter receive signals RS are processed similar to the troposcatter transmit signals TS. For example, the troposcatter receive signals RS can be filtered, amplified (e.g., via automatic gain control (AGC)), downconverted (e.g., demodulated), and converted to digital receive data RX via an analog-to-digital converter (ADC).

The different channels of the digital receive data RX are provided to a combiner/equalizer 418 in the receive path 404 of the modem. The combiner/equalizer 418 is configured to combine and equalize the digital receive data RX into coherent symbols. The digital receive data RX is then provided to a demapper 420 that is configured to demap the symbols of the digital receive data RX into data. The digital receive data RX is then provided to an FEC decoder 422 that is configured to provide an FEC decoder function to correct and decode the digital receive data RX (e.g., opposite the FEC encoder 410). The digital receive data RX is then provided to a data decrypter 424 that is configured to decrypt the digital receive data RX (e.g., opposite the data encrypter 408, such as an AES 256-bit decryption function). The digital receive data RX is then provided to a data decompressor 426 that is configured to implement a data decompression algorithm on the digital receive data RX (e.g., 1:10 decompression). Thereafter, the digital receive data RX is provided from a data interface of the modem of the troposcatter radio 400.

As an example, the troposcatter radio 400 can be tunable from approximately 60 MHz to approximately 6 GHz for operation in multiple frequency bands. The compact size of the troposcatter radio 400 can result from the MIMO transceiver 416 being provided as a zero-intermediate frequency (IF) MIMO transceiver design. Therefore, the MIMO transceiver 416 can operate with significantly lower power and a smaller footprint relative to typical troposcatter radio/modem designs. As demonstrated in the example of FIG. 4, the MIMO transceiver 416 can include two transmit channels and four receive channels and can be user configurable for single, dual, or quad diversity system configurations for high-performance of the troposcatter radio 400. The troposcatter radio 400 described herein can utilize APSK modulation schemes to provide for a low peak-to-average power ratio (PAPR). Therefore, modulation with low PAPR provides significantly improved efficiency of high-power amplifiers, such as solid-state power Amplifiers (SSPAs). As a result, the electronics package 300 can be designed smaller and more lightweight than in typical troposcatter terminals. Additionally, operating with nearly no back-off relative to other common forms of modulation in typical troposcatter terminals, such as Quadrature Amplitude Modulation (QAM), the APSK modulation of the troposcatter radio 400 increases the range of the portable troposcatter communication terminal relative to other troposcatter terminals.

As another example, to maintain operation within allocated transmit channels, the troposcatter radio 400 can include user-selectable symbol rates ranging from approximately 2.5 Mbaud to 20 Mbaud. As an example, each symbol rate can have up to 47 Modulation and Coding (MODCOD) combinations available to the user. For each MODCOD, a specified FEC rate can be selected. Additionally, the Low-Density Parity Check (LDPC) FEC rates can range from approximately 0.5 to 0.9 across all MODCODs. For example, once the user has specified the symbol rate, the troposcatter radio 400 can either be operated in fixed rate mode, where the data rate (MODCOD) is set by the user and is static during operation, or operated in an Adaptive Code Modulation (ACM) mode where the radio determines the optimal MODCOD dynamically on a frame-by-frame basis. Operating in ACM mode can allow the troposcatter radio algorithm to continuously analyze the SNR of the link and to automatically select the transmission rate that results in maximum link utilization.

While in ACM mode, the troposcatter radio 400 can seamlessly change from one MODCOD to another on a frame-by-frame basis. Once the user selects the symbol rate, the troposcatter radio 400 can change MODCODs while maintaining the selected symbol rate. Therefore, the channel bandwidth can remain constant, and the allocated channel bandwidth is not exceeded due to changes in MODCOD. As another example, the troposcatter radio 400 can operate in either single-stream or dual-data-stream (DDS) mode. In single-stream mode, the troposcatter radio 400 can transmit the same user data on multiple transmit channels. In the single-stream mode, for example, the maximum throughput can exceed 100 Mbps. In DDS mode, the troposcatter radio 400 transmits unique user data on each transmit channel, thereby effectively multiplying (e.g., doubling) the maximum radio throughput to over 200 Mbps.

As another example, the troposcatter radio 400 can be configured to implement adaptive transmit power control. For example, based on the adaptive transmit power control, the troposcatter radio 400 can be configured to reduce transmit power in link conditions where the received signal levels are well above those which would yield a desired Bit Error Rate (BER) performance while still maintaining an adequate link margin. The reduction in transmit power has the benefit of reducing the area of signal intercept, which can also reduce the possibility of interference with other communication systems beyond the distant other troposcatter terminal.

The troposcatter radio 400 described herein therefore operates with significantly greater efficiency than troposcatter radios associated with typical troposcatter terminals. Therefore, the reduction in power required for processing the troposcatter communication signals, in both the transmit and receive directions, provides for significantly greater weight reduction of the portable troposcatter communication terminal. For example, the efficiencies of the troposcatter radio 400 can provide for much smaller amplifiers and power sources, as well as the ability to use a much smaller antenna. Therefore, the efficient design of the troposcatter radio 400 provides for significant greater portability of the portable troposcatter communication terminal.

Figure 5:
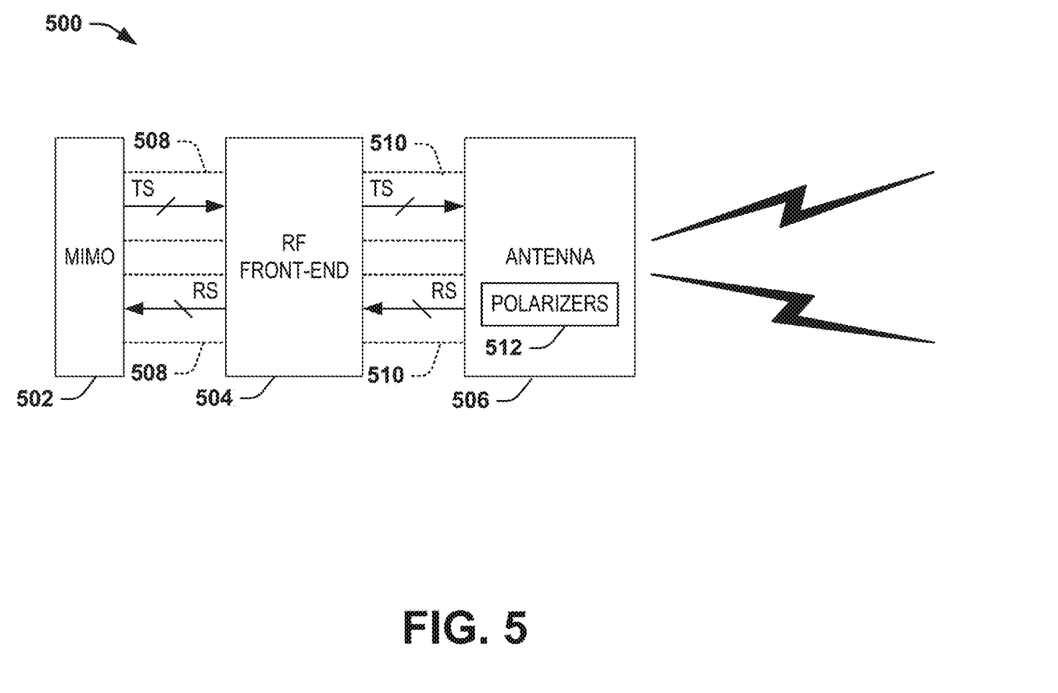
FIG. 5 illustrates another example of a block diagram of a troposcatter radio.

FIG. 5 illustrates another example of a block diagram of a troposcatter radio 500. The troposcatter radio 500 can correspond to the troposcatter radios 320 and 400 in the examples of FIGS. 3 and 4. Therefore, reference is to be made to the examples of FIGS. 3 and 4 in the following description of the example of FIG. 5.

The troposcatter radio 500 includes a MIMO transceiver 502, which can correspond to the MIMO transceiver 416 in the example of FIG. 4. The MIMO transceiver 502 provides the troposcatter transmit signals TS to an RF front-end 504, and the RF front-end 504 provides troposcatter receive signals RS to the MIMO transceiver 502. The RF front-end can provide amplification of the troposcatter transmit signals TS for wireless transmission of the troposcatter transmit signals TS from an antenna 506, and can provide amplification of the troposcatter receive signals RS received at the antenna 506. In the example of FIG. 5, the MIMO transceiver 502 and the RF front-end 504 are closely coupled, as indicated by the dashed lines 508 surrounding the troposcatter transmit signals TS and the troposcatter receive signals RS, and the RF front-end 504 and the antenna 506 are closely coupled, as indicated by the dashed lines 510.

For example, the MIMO transceiver 502 and the RF front-end 504 can be directly coupled, such as without cables or based on an integral connection of the troposcatter communication channels between the MIMO transceiver 502 and the RF front-end 504. The connection can thus correspond to a direct mechanical connection of radio ports between the MIMO transceiver 502 and the RF front-end 504. Similarly, the RF front-end 504 and the antenna 506 can be directly coupled, such as without cables or based on an integral connection of the troposcatter communication channels between the RF front-end 504 and the antenna 506. Alternatively, the RF front-end 504 and the antenna 506 can be coupled by a very short cable (e.g., less than approximately 5 inches). The connection can thus correspond to a direct mechanical connection or a short connection of radio ports between the RF front-end 504 and the antenna 506.

In the example of FIG. 5, the antenna 506 includes polarizers 512 that are configured to provide linear polarization of the troposcatter transmit signals TS and to receive linearly polarized troposcatter receive signals RS. For example, the polarizers 512 can include a horizontal linear polarizer and a vertical linear polarizer on each of multiple frequency channels for each of the troposcatter transmit signals TS and the troposcatter receive signals RS. Therefore, the troposcatter radio 500 can provide signal diversity for more efficient communication to and from the portable troposcatter communication terminal in a given troposcatter communication system, as described above.

Figure 6:
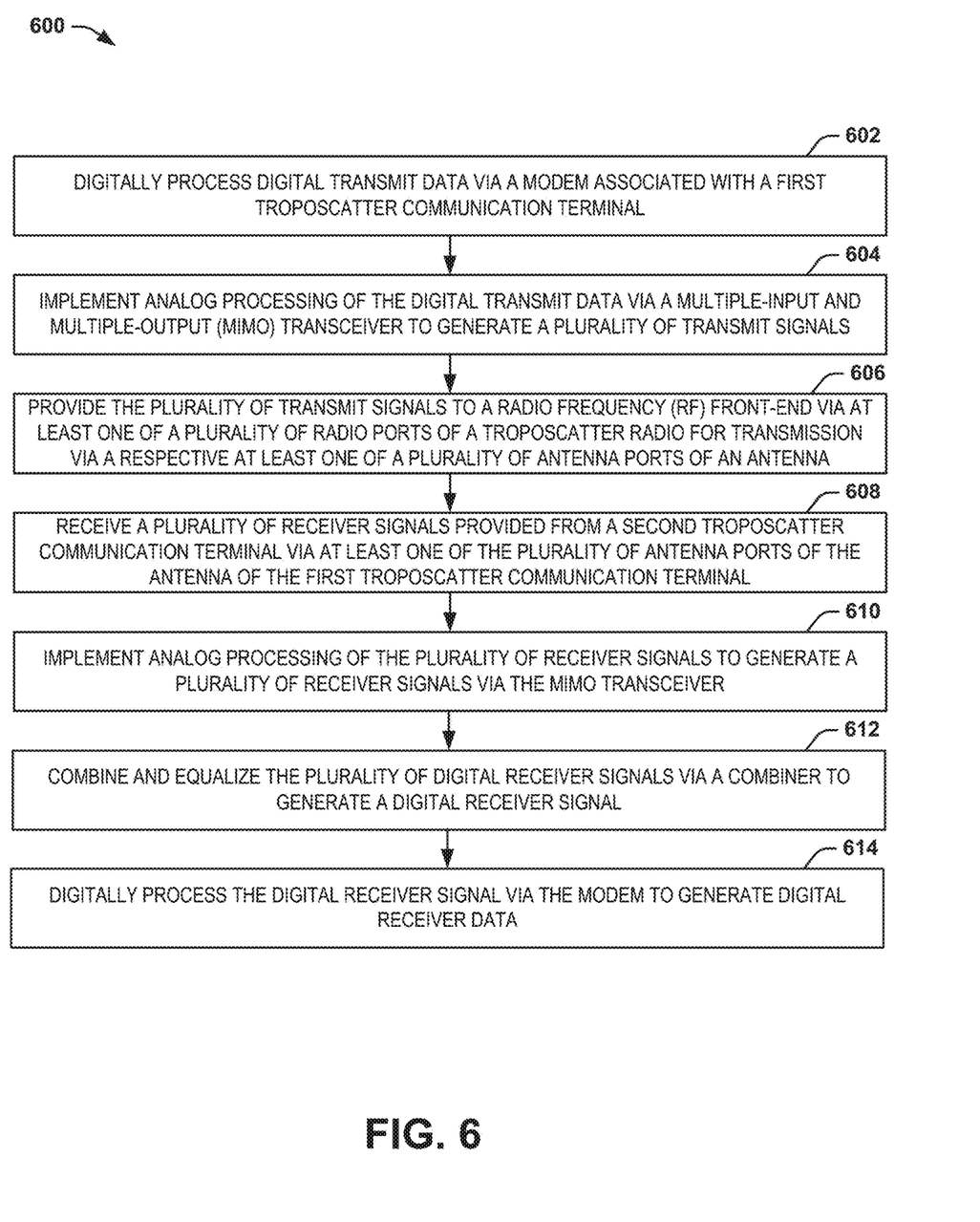
FIG. 6 illustrates an example of a method for providing troposcatter communication.

In view of the foregoing structural and functional features described above, methods in accordance with various aspects of the present disclosure will be better appreciated with reference to FIG. 6. While, for purposes of simplicity of explanation, the method of FIG. 6 is shown and described as executing serially, it is to be understood and appreciated that the present disclosure is not limited by the illustrated orders, as some aspects could, in accordance with the present disclosure, occur in different orders and/or concurrently with other aspects from that shown and described herein. Moreover, not all illustrated features may be required to implement method in accordance with an aspect of the present disclosure.

FIG. 6 illustrates a method 600 for providing troposcatter communication. At 602, digital transmit data (e.g., the digital transmit data TX) is digitally processed via a modem (e.g., the transmit path 402 and the receive path 404) associated with a first troposcatter communication terminal (e.g., the first troposcatter terminal 102). At 604, analog processing of the digital transmit data is implemented via a multiple-input and multiple-output (MIMO) transceiver (e.g., the MIMO transceiver 416) to generate a plurality of transmit signals (e.g., the transmit signals TS). At 606, the plurality of transmit signals is provided to a radio frequency (RF) front-end (e.g., the RF front-end 504) via at least one of a plurality of radio ports of a troposcatter radio (e.g., the troposcatter radio 400) for transmission via a respective at least one of a plurality of antenna ports of an antenna. The troposcatter radio is provided in an electronics package (e.g., the electronics package 210) that is mechanically connected to a rear side of the antenna such that the plurality of radio ports of the troposcatter radio are mechanically connected to the respective plurality of antenna ports. At 608, a plurality of receiver signals (e.g., the receiver signals RS) provided from a second troposcatter communication terminal (e.g., the troposcatter terminal 104) are received via at least one of the plurality of antenna ports of the antenna of the first troposcatter communication terminal. At 610, analog processing of the plurality of receiver signals is implemented to generate a plurality of receiver signals via the MIMO transceiver. At 612, the plurality of digital receiver signals is combined and equalized via a combiner to generate a digital receiver signal (e.g., the digital receiver signal RX). At 614, the digital receiver signal is digitally processed via the modem to generate digital receiver data.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A troposcatter communication terminal comprising:
   an antenna comprising a plurality of communication ports that extend from a rear side of the antenna to a front side of the antenna;
   a positioner mechanically coupled to the antenna and being configured to mechanically control positioning of the antenna; and
   an electronics package mechanically coupled to the rear side of the antenna, the electronics package comprising a troposcatter radio communicatively coupled to the antenna via the plurality of communications ports to transmit and receive troposcatter communication signals via the plurality of communication ports at the front side of the antenna.

2. The terminal of claim 1, wherein the troposcatter radio comprises a plurality of communication ports that are directly mechanically coupled to the communication ports associated with the antenna.

3. The terminal of claim 1, wherein the troposcatter radio comprises a plurality of communication ports that are coupled to the communication ports by respective cables having a length less than five inches.

4. The terminal of claim 1, wherein the troposcatter radio comprises a plurality of communication ports that are integral with the communication ports associated with the antenna.

5. The terminal of claim 1, wherein the troposcatter radio comprises:
   a radio frequency (RF) front-end configured to transmit a plurality of transmit signals across a respective plurality of transmission channels and to receive a plurality of receiver signals across a respective plurality of receiver channels;
   a multiple-input and multiple-output (MIMO) transceiver configured to provide analog processing of the plurality of transmit signals and the plurality of receiver signals; and
   a modem configured to modulate digital transmit data into the plurality of transmit signals and to demodulate the plurality of receiver signals into digital receiver data.

6. The terminal of claim 5, wherein the modem comprises:
   a data compressor configured to implement a compression algorithm to compress the digital transmit data;
   a data encryption component configured to implement an encryption algorithm to encrypt the digital transmit data;
   an error correction coder configured to implement an error correction code to code the digital transmit data;
   a mapper configured to implement a mapping algorithm to map the digital transmit data; and a framer configured to implement a framing algorithm to frame the digital transmit data that is provided to the MIMO for processing to be transmitted as the plurality of transmission channels via the antenna.

7. The terminal of claim 5, wherein the modem comprises a combiner configured to combine and equalize the plurality of receiver signals to generate a digital receiver signal corresponding to the plurality of receiver signals.

8. The terminal of claim 7, wherein the modem further comprises:
   a demapper configured to implement a demapping algorithm to demap the digital receiver signal;
   an error correction decoder configured to implement an error correction decoder algorithm to decode the digital receiver signal;
   a data decryption component configured to implement a decryption algorithm to decrypt the digital receiver signal; and
   a data decompressor configured to implement a decompression algorithm to decompress the digital receiver signal.

9. The terminal of claim 5, wherein the RF front-end, the MIMO transceiver, and the modem are communicatively coupled together without interposing cables.

10. The terminal of claim 1, wherein the antenna is formed of a carbon fiber material, and wherein the terminal further comprises a collapsible tripod to provide singular human portability of the terminal.

11. The terminal of claim 10, wherein the terminal is collapsible to a volume of less than approximately six cubic feet and has a weight of less than approximately 100 pounds.

12. The terminal of claim 1, wherein the troposcatter radio is configured to operate with a prime power of less than approximately 150 Watts.

13. A method for providing troposcatter communication, the method comprising:
   digitally processing digital transmit data via a modem associated with a first troposcatter communication terminal;
   implementing analog processing of the digital transmit data via a multiple-input and multiple-output (MIMO) transceiver to generate a plurality of transmit signals;
   providing the plurality of transmit signals to a radio frequency (RF) front-end via at least one of a plurality of radio ports of a troposcatter radio for transmission via a respective at least one of a plurality of antenna ports of an antenna, the troposcatter radio being provided in an electronics package that is mechanically connected to a rear side of the antenna such that the plurality of radio ports of the troposcatter radio are mechanically connected to the respective plurality of antenna ports;
   receiving a plurality of receiver signals provided from a second troposcatter communication terminal via at least one of the plurality of antenna ports of the antenna of the first troposcatter communication terminal;
   implementing analog processing of the plurality of receiver signals to generate a plurality of receiver signals via the MIMO transceiver;

combining and equalizing the plurality of digital receiver signals via a combiner to generate a digital receiver signal; and digitally processing the digital receiver signal via the modem to generate digital receiver data.

14. The method of claim 13, wherein the RF front-end, the MIMO transceiver, and the modem of the first troposcatter communication terminal are communicatively coupled together without interposing cables.

15. The method of claim 13, wherein the antenna of the first troposcatter communication terminal is formed of a carbon fiber material, and wherein the first troposcatter communication terminal further comprises a collapsible tripod to provide singular human portability of the first troposcatter communication terminal.

16. The method of claim 13, wherein the troposcatter radio comprises a plurality of communication ports that are one of: directly mechanically coupled to the communication ports associated with the antenna, coupled to the communication ports by respective cables having a length less than five inches, or integral with the communication ports associated with the antenna.

17. A troposcatter communication system comprising:
a first troposcatter communication terminal comprising:
a carbon fiber antenna comprising a plurality of communication ports that extend from a rear side of the antenna to a front side of the antenna;
an electronics package mechanically coupled to the rear side of the antenna, the electronics package comprising a troposcatter radio communicatively coupled to the antenna via the plurality of communications ports to transmit and receive troposcatter communication signals via the plurality of communication ports at the front side of the antenna, the electronics package operating with a prime power of less than approximately 150 Watts; and
a collapsible tripod to provide singular human portability of the first troposcatter communication terminal, such that the first troposcatter communication terminal is collapsible to a volume of less than approximately six cubic feet and has a weight of less than approximately 100 pounds; and
a second troposcatter communication terminal comprising:
an antenna comprising a plurality of communication ports; and
a troposcatter radio communicatively coupled to the antenna via the plurality of communications ports to transmit the troposcatter communication signals to and receive the troposcatter communication signals from the first troposcatter communication terminal via the plurality of communication ports.

18. The system of claim 17, wherein the troposcatter radio of the first troposcatter communication terminal comprises a plurality of communication ports that are one of: directly mechanically coupled to the communication ports associated with the antenna, coupled to the communication ports by respective cables having a length less than five inches, or integral with the communication ports associated with the antenna.

19. The system of claim 17, wherein the troposcatter radio of the first troposcatter communication terminal comprises:
a radio frequency (RF) front-end configured to transmit a plurality of transmit signals across a respective plurality of transmission channels and to receive a plurality of receiver signals across a respective plurality of receiver channels;
a multiple-input and multiple-output (MIMO) transceiver configured to provide analog processing of the plurality of transmit signals and the plurality of receiver signals; and
a modem configured to modulate digital transmit data into the plurality of transmit signals and to demodulate the plurality of receiver signals into digital receiver data.

20. The system of claim 17, wherein the modem comprises:
a combiner configured to combine and equalize the plurality of receiver signals to generate a digital receiver signal corresponding to the plurality of receiver signals.

\* \* \* \* \*